Oct. 30, 1928.
J. BREIDT
1,689,909
ANTITHEFT ALARM
Filed Aug. 12, 1927
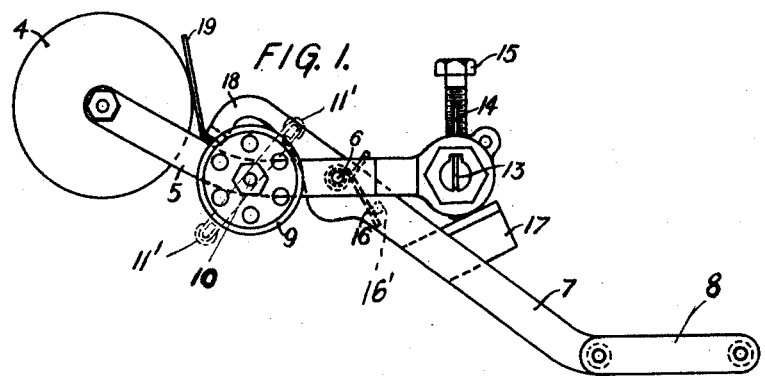
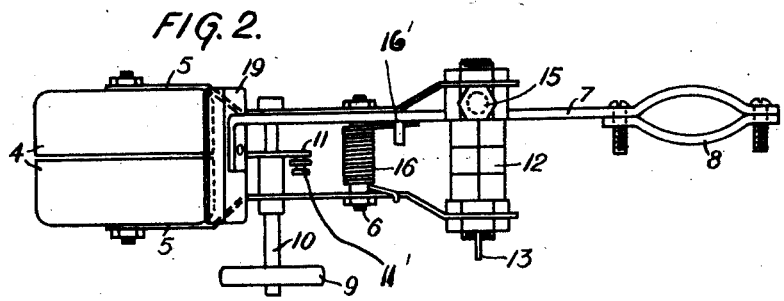
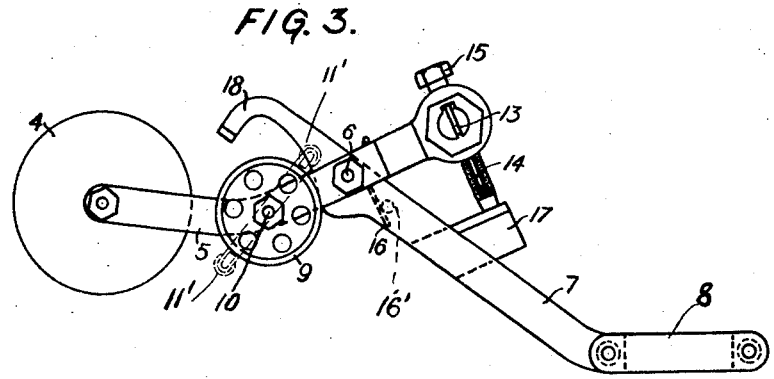
INVENTOR.
JAKOB BREIDT.
BY
ATTORNEY.

Patented Oct. 30, 1928.

1,689,909

UNITED STATES PATENT OFFICE.

JAKOB BREIDT, OF PORT WASHINGTON, NEW YORK.

ANTITHEFT ALARM.

Application filed August 12, 1927. Serial No. 212,369.

This invention relates to alarm devices with particular reference to such as are adapted to indicate the unlawful use of vehicles.

In the past, it has been an easy matter for thieves to drive bicycles, motorcycles, automobiles, etc., without persons knowing whether or not they were the rightful owners.

It is therefore the main object of this invention to provide an alarm adapted to set up an audible or visible, or both types of signal, if someone attempts unauthorized use of a vehicle left unattended.

A further object is in the provision of means to set the alarm in an operative or inoperative position, as may be desired A still further aim is to provide a theft signal, positively operable by friction with the wheels or axle of the vehicle.

These several objects, together with others, which will become apparent as the description progresses, are accomplished by the novel construction, combination and arrangement of elements, hereinafter described and illustrated in the accompanying drawing, constituting an important component of this disclosure, and in which:—

Figure 1 is a side elevational view of an alarm as used on bicycles or motorcycles and shown in an operative position.

Figure 2 is a top plan view of the same.

Figure 3 is a side elevational view of the device as used on automobiles and shown in an operative position.

In the drawing, the numeral 4 generally designates the opposed, cylindrical sections of a bell secured intermediate the ends of a pair of spaced support arms 5.

The arms 5 are fixed on a shaft 6, which is rotatably mounted in a bracket arm 7 having a clamp 8 on its inner end by which the device may be secured to a convenient part of the chassis of a bicycle, motorcycle or automobile.

The device is to be so positioned that a roller 9 fixed on a shaft 10 rotatable in the arms 5 will contact with one of the wheels or axles of the vehicle.

Secured on the shaft 10, intermediate the arms 5, is a lever 11 carrying hammers 11' on its ends, alternately engageable, as will be seen, with the bell 4.

Rigidly mounted between the outer ends of the arms 5 is a cylinder lock 12 having a key 13, the bolt of the lock being engageable in a slot 14 formed longitudinally in the side of a screw 15 threaded diametrically through the lock casing 12, its point being contactable with a fixed stop 17.

Coiled about the shaft 6 is a torsion spring 16, one end of which engages one of the arms 5 and the other end of which engages a stud 16' on the inner surface of the bracket arm 7, so that the set screw 15 will always be in contact with a stop projection 17 extending outwardly from the bracket arm 7.

The outer end 18 of the arm is hooked and carries a plate 19 bearing the word "Thief", the latter being used only with bicycles and motorcycles, but not with autos.

Thus, when the vehicle is left unattended, the arms 5 are engaged with the upper end of the screw 15 and are locked in that position by the key 13.

This position causes the roller 9 to frictionally engage the wheel or axle of the vehicle and if the same be driven, the hammers 11' will rotate to ring the bell 4, which in the case of the bicycle and motorcycle would attract the attention of passing persons to the sign "Thief".

Thus, it will be seen that a device has been disclosed, adapted to set up an alarm should an attempt be made to operate vehicles of the type mentioned when the device is in position.

While the foregoing is descriptive of the preferred embodiment of my invention, I do not desire to have the same interpreted in a limiting sense, as obviously, changes in construction and details thereof may be made without departing from the spirit and scope of the claims hereto appended.

Having thus described my invention, what I claim as new and desire to secure by Letters Patent, is:—

1. An anti-theft alarm for the wheels of a vehicle, comprising a bracket, a pair of arms pivoted to said bracket, a bell carried by said arms, positive mechanical means to lock said arms in operative and inoperative position, a shaft rotatable in said arms, a pair of hammers on said shaft, and a roller on said shaft frictionally engageable with the vehicle wheels to operate said hammers.

2. An anti-theft alarm comprising, a bracket, a pair of arms pivoted to said bracket, a bell carried by said arms, frictionally operated means including a rotary member to ring said bell, a key actuated cylindrical lock carried by said arms, a screw passing diametrically through said lock and engageable thereby, and a stop for said screw.

In witness whereof I have affixed my signature.

JAKOB BREIDT.